United States Patent
Hackl et al.

(10) Patent No.: US 9,539,741 B2
(45) Date of Patent: Jan. 10, 2017

(54) ROTOR DISK

(75) Inventors: Manfred Hackl, Linz-Urfahr (AT);
Klaus Feichtinger, Linz (AT);
Gerhard Wendelin, Linz (AT)

(73) Assignee: EREMA ENGINEERING RECYCLING MASCHINEN UND ANLAGEN GESELLSCHAFT M.B.H., Ansfelden (AT)

( * ) Notice: Subject to any disclaimer, the term of this patent is extended or adjusted under 35 U.S.C. 154(b) by 298 days.

(21) Appl. No.: 13/522,267

(22) PCT Filed: Jan. 7, 2011

(86) PCT No.: PCT/AT2011/000003
§ 371 (c)(1),
(2), (4) Date: Dec. 6, 2012

(87) PCT Pub. No.: WO2011/085417
PCT Pub. Date: Jul. 21, 2011

(65) Prior Publication Data
US 2013/0119173 A1 May 16, 2013

(30) Foreign Application Priority Data
Jan. 14, 2010 (AT) ........................................ 44/2010

(51) Int. Cl.
B29B 7/12 (2006.01)
B29B 7/40 (2006.01)
(Continued)

(52) U.S. Cl.
CPC ............... B29B 7/12 (2013.01); B02C 18/086 (2013.01); B02C 18/182 (2013.01); B02C 23/00 (2013.01);
(Continued)

(58) Field of Classification Search
CPC ............. B02C 2/10; B02C 7/12; D21D 1/303; D21D 1/306; D21D 1/30
(Continued)

(56) References Cited

U.S. PATENT DOCUMENTS 8,419 A * 10/1851 Elmore ...................... 174/163 R
20,601 A * 6/1858 Wilson .......................... 241/296
(Continued)

FOREIGN PATENT DOCUMENTS

AT        411342 B     12/2003
DE       951706 C     10/1956
(Continued)

OTHER PUBLICATIONS

International Search Report mailed on Apr. 15, 2011, for PCT Patent Application No. PCT/AT2011/000003, 9 pages.
(Continued)

*Primary Examiner* — Faye Francis
*Assistant Examiner* — Onekki Jolly
(74) *Attorney, Agent, or Firm* — Kilpatrick Townsend & Stockton LLP

(57) ABSTRACT

The invention at hand relates to a rotor disk (1) to be inserted into a receptacle (2) for the treatment of polymers, having a disk body (3) on whose top side (4) mixing and/or comminuting tools (5) are providable and on whose opposite underside (6) a number of conveying ribs (7) extending from the interior to the exterior are provided with which during operation polymer particles are transportable towards the exterior or, respectively, that during operation exert a force directed from the center (8) of the rotor disk (1) towards the exterior on the polymer particles grasped by the conveying ribs (7). In accordance with the invention it is provided that the conveying ribs (7) are curved concavely in the direction of rotation or, respectively, of movement.

20 Claims, 2 Drawing Sheets

(51) Int. Cl.
    *B02C 23/00*    (2006.01)
    *B02C 18/08*    (2006.01)
    *B02C 18/18*    (2006.01)
    *B29B 17/04*    (2006.01)
(52) U.S. Cl.
    CPC ............ *B29B 7/40* (2013.01); *B29B 17/0412*
        (2013.01); *B29B 2017/048* (2013.01); *Y02W 30/625* (2015.05)
(58) Field of Classification Search
    USPC .......................... 241/296–298, 261.2, 261.3
    See application file for complete search history.

(56)         References Cited

U.S. PATENT DOCUMENTS

| | | | | |
|---|---|---|---|---|
| 27,551 | A | * | 3/1860 | LittlePage ..................... 241/296 |
| 381,522 | A | * | 4/1888 | Bachulein ..................... 241/296 |
| 1,169,228 | A | * | 1/1916 | Barker ..................... B02C 7/12 241/296 |
| 1,556,323 | A | * | 10/1925 | Garza ........................... 241/298 |
| 1,556,870 | A | * | 10/1925 | Nelson .......................... 241/296 |
| 1,609,717 | A | * | 12/1926 | Holland-Letz ............. 241/261.3 |
| 2,665,853 | A | * | 1/1954 | Nicholson, Jr. ............... 241/298 |
| 2,681,598 | A | * | 6/1954 | Baxter, Jr. .................... 241/278.1 |
| 3,674,217 | A | * | 7/1972 | Reinhall ........................ 241/21 |
| 4,023,737 | A | * | 5/1977 | Leider et al. .............. 241/261.3 |
| 5,509,610 | A | * | 4/1996 | Gibbons et al. ................ 241/37 |
| 6,726,622 | B2 | * | 4/2004 | Spence et al. ................ 600/210 |
| 7,191,967 | B2 | * | 3/2007 | Vuorio et al. ............. 241/261.3 |
| 7,291,001 | B2 | * | 11/2007 | Bacher et al. ................ 425/202 |
| 7,407,123 | B2 | * | 8/2008 | Antensteiner .............. 241/261.2 |
| 2006/0175447 | A1 | * | 8/2006 | Duggan ..................... 241/261.2 |
| 2007/0205314 | A1 | * | 9/2007 | Gingras ..................... 241/261.3 |
| 2008/0296419 | A1 | * | 12/2008 | Gingras .......................... 241/28 |

FOREIGN PATENT DOCUMENTS

| | | |
|---|---|---|
| DE | 1858029 U | 9/1962 |
| NL | 72828 C | 2/1953 |
| WO | 2008/098274 A1 | 8/2008 |

OTHER PUBLICATIONS

International Preliminary Report on Patentability mailed on Aug. 7, 2012, for PCT Application No. PCT/AT2011/000003, 25 pages.

* cited by examiner

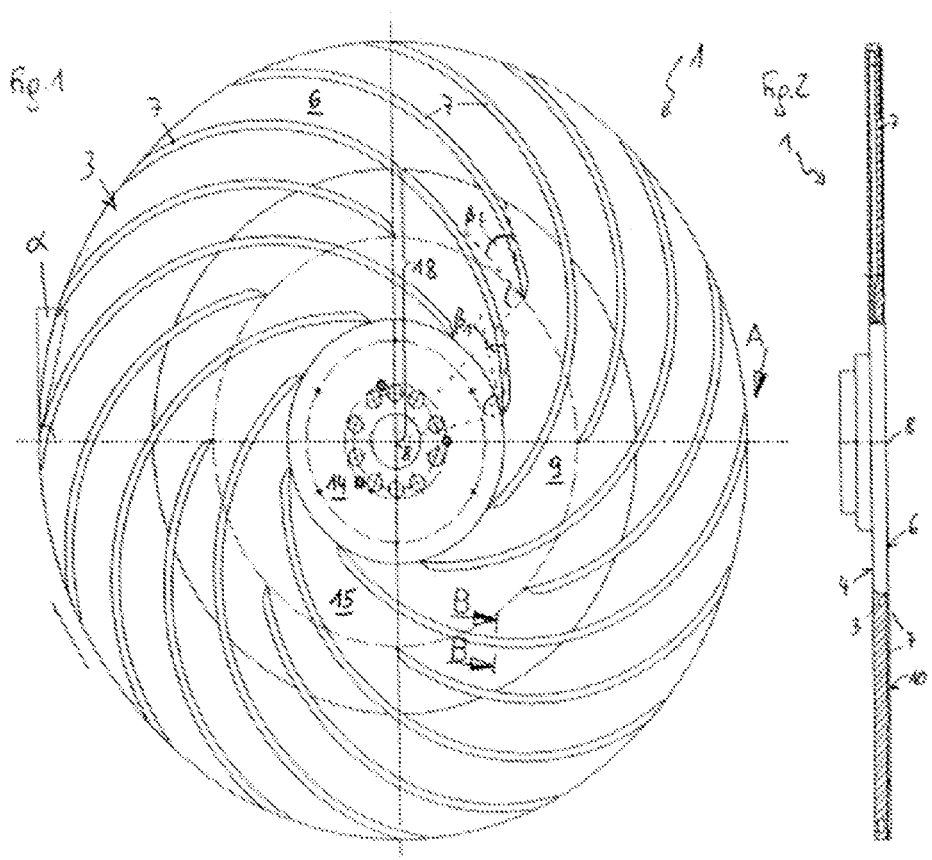

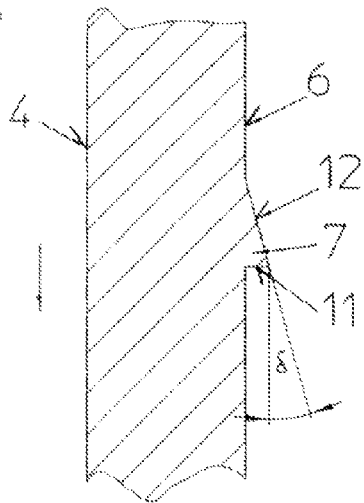
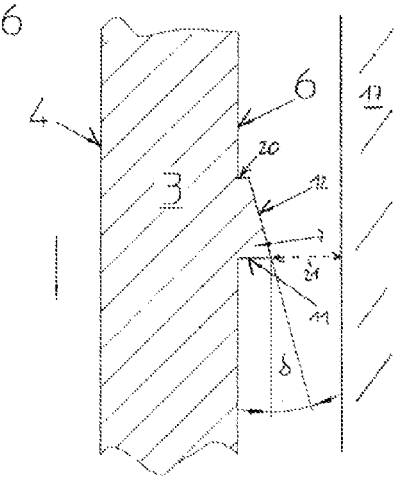
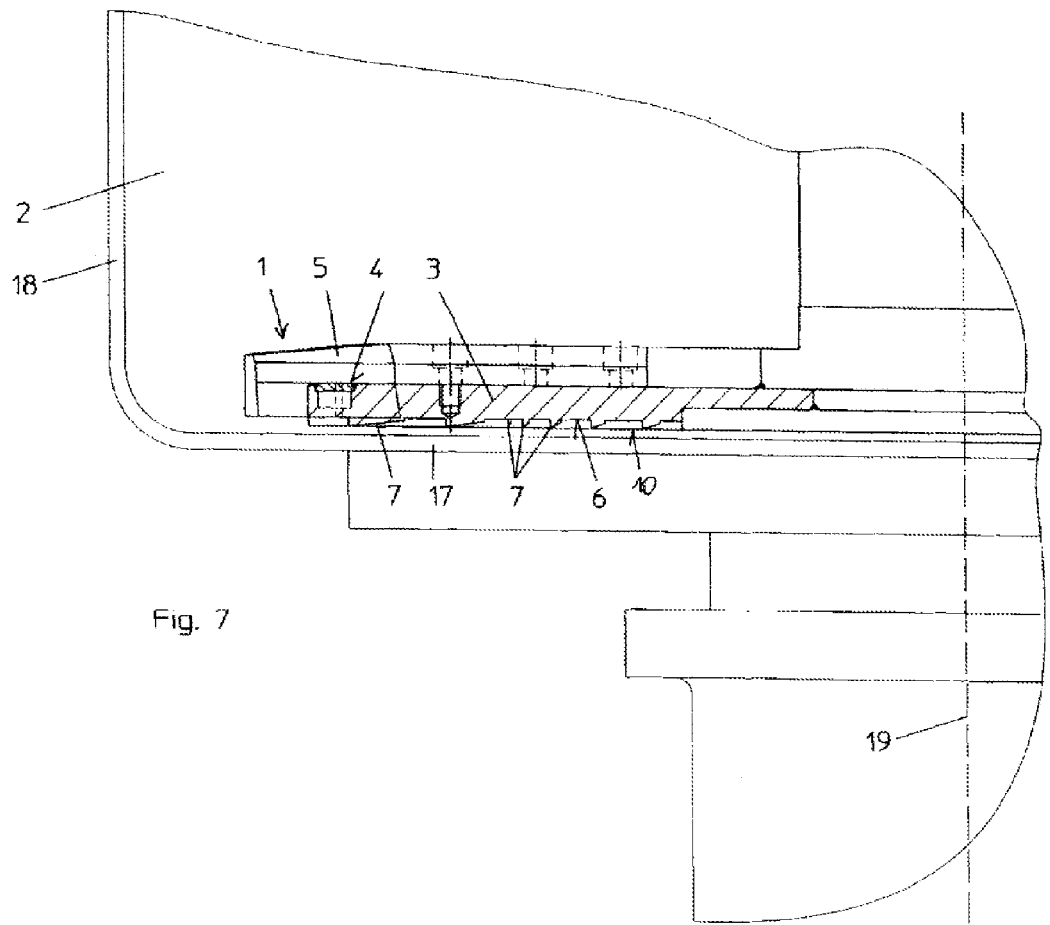

ROTOR DISK

CROSS-REFERENCES TO RELATED APPLICATIONS

This application is a U.S. National Phase under 35 USC 371 of PCT Application No. PCT/AT2011/000003 filed Jan. 7, 2011, which claims priority to the Austrian Application No. A 44/2010, filed Jan. 14, 2010, the disclosures of which are incorporated by reference herein.

BACKGROUND OF THE INVENTION

The invention relates to a rotor disk (1) to be inserted into a receptacle (2) for the treatment of polymers, having a disk body (3) on whose top side (4) mixing and/or comminuting tools (5) are providable and on whose opposite underside (6) a number of conveying ribs (7) extending from the interior to the exterior are provided with which during operation polymer particles are transportable towards the exterior or, respectively, that during operation exert a force directed from the center (8) of the rotor disk (1) towards the exterior on the polymer particles grasped by the conveying ribs (7). In accordance with the invention it is provided that the conveying ribs (7) are curved concavely in the direction of rotation or, respectively, of movement.

Rotor disks in various designs have been known from the state of the art. They are most often arranged near the bottom of a receptacle or, respectively, of a cutter compactor for the processing and conditioning of thermoplastic polymers and essentially consist of a disk-shaped tool carrier at whose top side mixing or, respectively, stirring tools or comminutors are arranged. During operation, the disk revolves and the tools will grasp and, if necessary, comminute the synthetic material fed into the container while simultaneously heating it. In addition, the material is being stirred and constantly moved to the effect that a mixing vortex will form in the container.

In general, devices for the processing of polymers have also been known from the state of the art, for example from AT 375 867 B, AT 407 970 B or WO 93/18902. Due to the revolving tool carriers or, respectively, the tools, the treated synthetic material is hurled against the lateral wall of the container through the effect of centrifugal force. A portion of the synthetic material rises up along the lateral wall of the container and revolves in the form of a mixing vortex but will ultimately fall back into the center of the container. This will result in the desired retention time of the treated synthetic particles in the receptacle so that the synthetic material fed into it will be thoroughly mixed, sufficiently heated by the friction forces and, in the case of tools acting in comminuting fashion on the synthetic material, sufficiently comminuted.

However, it has shown that not the entire amount of synthetic material hurled against the lateral wall of the container rises up on said wall but that a portion will end up below the lowest tool or, respectively, below the lowest disk forming the tool carrier. There, the synthetic portion may fuse in uncontrolled fashion due to the friction effect.

Attempts have been made to avoid this disadvantage through the attachment of conveying ribs to the underside of this disk. From the state of the art, it has been known with regard thereto to attach to the underside of the disk or, respectively, of the tool carrier straight and radial ribs that serve to transport any synthetic material that ends up between the bottom of the cutter compactor and the underside of the tool carrier back towards the exterior and to remove it again from that area.

However, this measure has not been entirely satisfactory. In particular in the case of large-dimensioned receptacles and a correspondingly great filling volume of several hundred kilograms of polymer material, correspondingly large disks with large diameters must be employed. These disks must, on the one hand, be manufactured with great precision and also rotate very quietly and regularly since the distance between the disk and the bottom amounts to only a few millimeters. In such large-dimensioned cutter compactors, great demands are made on the transportation effect of the ribs since, as mentioned before, a great amount of material to be treated is present in the container that, on the one hand, is to be moved and that, on the other hand, exerts great downward pressure due its great own weight, forcing itself into the space between the disk and the bottom.

During the upscaling of such devices it has shown that the conveying capability of the known disks that work sufficiently in the case of small containers will no longer suffice in the case of large containers in order to keep the material away from the problem area. Nor can the rotational speed of the mixing tools used to give the material an upward movement and to increase the retention time be increased at will since due to the generated friction, more heat would be produced that could lead to a local fusion of the flakes.

Again and again, polymer flakes will then end up in the exterior area between the bottom and the disk and remain there permanently. This will increase the temperature in this area, the flakes will agglomerate, becoming gluey and possibly melting, leading to even more flakes accumulating. After some time, the disk will begin to rattle and ultimately jam. Therefore, it is desirable that in the event that at some time a particle does become wedged between the ribs and the container bottom, this particle will be swiftly freed and subsequently be effectively removed again from the critical area.

Moreover, not only larger flakes but also smaller dust particles end up in the critical area below the disk, with the dust particles penetrating even further in the direction of the center of the disk and remaining there. These fine polymer particles will then be heated too much as well and be isolated and caught in the critical area.

In general, this is problematic in the case of disks with a smaller diameter as well since, in particular in the case of heavy grist loads, lower rotational speeds, i.e. relatively low circumferential speeds, are being used.

BRIEF SUMMARY OF THE INVENTION

It is therefore the objective of the invention at hand to create a rotor disk that, in particular in the case of a high filling volume and large dimensions, effectively prevents polymer particles from ending up in the critical area between the disk and the bottom of the receptacle or, respectively, that removes them from this area swiftly and completely.

This objective is met by the characterizing features of claim 1. In this case it is provided that the conveying ribs are curved concavely in the direction of rotation.

Surprisingly, it has turned out that this will have the effect that during the treatment and conditioning of synthetic particles at a great filling volume and correspondingly high downward pressure, larger and coarser polymer flakes that, if anything, will penetrate to the outer edge of the disk as well as finer dust particles that can penetrate very far into the interior will be transported towards the exterior, thereby leaving the critical area essentially permanently free of such particles. In the event that a particle does penetrate further, for example when the treatment is interrupted unexpectedly and the agitator must be stopped, it will be swiftly removed again.

The fan effect or, respectively, the conveying effect of a disk with such conveying ribs is very high in this particular system and for this particular purpose, making an effective and homogeneous processing of the polymer material present in the receptacle possible. Moreover, holding times and repair periods caused by a jamming of the disk will be avoided. In addition, the quality of the material to be treated will be improved since local overheating or fusion coating are prevented.

Additional advantageous embodiments of the invention will be described by the dependent claims:

To this end, it has proven to be advantageous in accordance with a particularly advantageous further development of the disk if the curvatures are uniform, in particular in the shape of a circular arc.

In this context it is particularly advantageous to provide that the curvatures of all conveying ribs are the same relative to each other. The construction of such a rotor disk is very easy to design.

If it is provided that at least two groups of coveying ribs are provided that start in alternating fashion at different distances from the center, to with from an inner central area and from an outer central area, the construction design of the disk will also be made easier since densely arranged conveying ribs will be avoided in the inner section of the disk.

It has turned out to be surprisingly advantageous for the conveying effect if the conveying ribs are not aligned radially towards the center but if the external end sections of the conveying ribs are arranged nearly tangentially to the edge of the rotor disk, in particular at an external intersecting angle of between 0° and 25°, preferably between 12° and 18°.

Likewise, it will be advantageous if the inner initial sections of the conveying ribs are set relative to the center or, respectively, to the inner central area or, respectively, to the outer central area at internal intersecting angles $\beta_1$ or, respectively, $\beta_2$ between 0° and 45°, preferably between 15° and 30°. In this context, it will be advantageous if $\beta_2$ is greater than $\beta_1$.

Each intersecting angle is measured in each case at the intersection point or, respectively, at the entry point with or, respectively, in the edge of the rotor disk or, respectively, the inner central area or, respectively, the outer central area. In this case, the intersecting angle is in each case the angle between the tangent placed onto the conveying rib at this intersecting point and the tangent placed onto the inner central area or, respectively, the outer central area at this intersecting point.

In this context it will be advantageous if it is provided that the conveying ribs have an essentially triangular cross section with a conveying surface aligned straight in the direction of rotation and essentially arranged vertically to the underside and a shoulder surface sloping downward downstream of the rotation direction. This will assure that if particles do end up below the disk, they will swiftly become free and be transported outside, thereby preventing a jamming or slowdown of the disk.

Moreover, in accordance with an advantageous embodiment of the invention, it is provided that the thickness of the disk body decreases towards the exterior. This characteristic supports the effect of the curved conveying ribs synergistically and, surprisingly, increases the effect even more. This will effectively prevent larger particles from wedging between the bottom and the disk, thereby causing the disk to jam. If in spite thereof particles are in danger of remaining in the small space between bottom and disk underside longer than planned, they will be freed more easily due to the externally decreasing thickness and transported toward the exterior.

In this context it will surprise that it suffices if the thickness decreases only by at least 1 mm, preferably between 1.5 to 3.5 mm, with this difference in the thickness of the disk body being measured in the center or, respectively, in an inner central area and at the external edge. It has surprisingly turned out that a great improvement can be achieved even with such minor changes.

A particularly advantageous embodiment provides for the height of the conveyor ribs to increase in the direction of their course towards the exterior.

In this case, it will be particularly advantageous that the thickness of the disk body decreases towards the exterior in the same measure as the height of the conveying ribs increases towards the exterior or, respectively, that the overall thickness of the rotor disk across its radius remains the same and constant. This way, great running smoothness and an efficient conveyance of the polymer particles from the critical area can be achieved.

Moreover, it will be advantageous if it is provided that the thickness of the disk body is constant in an inner area, starting to decrease only at a distance from the center of the rotor disk, preferably starting at a distance of 60% of the radius, in particular between 60% and 70%. Likewise, it will be advantageous if the height of the conveyor ribs remains constant within an inner area, starting to increase only at a distance from the center of the rotor disk, preferably starting at a distance of 60% of the radius, in particular between 60% and 70%. In this case, the changes of the dimension will occur only in an outer radial area, to with where the larger flakes can still barely penetrate. In this way, coarse as well as fine particles will be efficiently transported towards the exterior.

In accordance with a preferred embodiment it is provided that the points or, respectively, areas of the conveying ribs farthest from the top side of the disk body define or, respectively, open up a level plane. Looked at from the side, the overall thickness of the rotor disk therefore remains constant.

In this context it will be advantageous if it is provided that the top side of the disk body is level flat and/or that the plane runs parallel to the top side. Such a structural design is also relatively easy to manufacture and runs very smoothly.

A particularly effective rotor disk is characterized by the fact that the underside of the disk body, in the area in which its thickness decreases, is slanted and sloped towards the top side and/or towards the plane, in particular at an angle of maximally 3°, in particular between 0.4° and 0.6°. This will result in a quasi-truncated cone-shaped design of the disk, in which case it has again surprisingly turned out that only minor deviations and angle dimensions will suffice in order to achieve an efficient removal.

A structurally simple design of an embodiment provides that the decrease of the thickness of the disk body continually runs in a preferably straight or, respectively, level plane, thereby avoiding the occurrence of turbulences and improving a smooth run.

However, a rotor disk will be just as effective if it is provided that the decrease in the thickness of the disk body proceeds discontinuously or, respectively, in steps, if necessary in one single step. Whether a continuous or discontinuous decrease is more advantageous depends, among other things, on the type, the form and the dimensions of the material to be processed, for example, if it is foils, flakes or granulate that are being recycled.

In order to be able to influence, via the conveyor disk, the temperature of the material to be processed, it is provided in accordance with an advantageous further development that a hollow space is formed in the disk body, if necessary filled or perfusable with a coolant.

Moreover, it is provided in accordance with the invention that the rotor disk is arranged in a cutter compactor located at a short distance from the bottom. A particularly advantageous device for the processing and conditioning of synthetic material provides to this end for a receptacle, in particular an evacuatable one, with the rotor disk in accordance with the invention being arranged near and parallel to the bottom surface. To this end, the rotor disk is advantageously supported and drivable by an essentially vertically aligned shaft, providing the synthetic material present in the receptacle with a rotational movement around the axis of the shaft.

In a particularly advantageous embodiment, the distance between the rotor disk, to with between the outermost points or, respectively, edges of the conveying ribs that are the furthest away from the disk, and the bottom surface of the receptacle is smaller than the thickness of the disk body, preferably within the range between 3 and 15 mm, preferably between 4 to 8 mm.

Additional advantages and embodiments of the invention will result from the description and the enclosed drawings.

In the following, the invention will be represented in the drawings by way of a particularly advantageous embodiment and described in exemplary fashion, with references being made to the drawings.

BRIEF DESCRIPTION OF THE DRAWINGS

FIG. 1 shows the rotor disk in accordance with the invention from below.

FIG. 2 shows a cut view through the center of the disk in accordance with FIG. 1.

FIG. 3 shows an enlarged representation of the cut in accordance with FIG. 2.

FIG. 4 shows in detail the right side of the cut in accordance with FIG. 2 or, respectively, FIG. 3.

FIG. 5 shows the partial cut B-B of FIG. 1.

FIG. 6 shows detailed view A of FIG. 1.

FIG. 7 shows a sectional cut of a receptacle with a disk arranged in it.

DETAILED DESCRIPTION OF THE INVENTION

In FIG. 1, a particularly effective and advantageous rotor disk 1 is represented in exemplary fashion, with FIG. 1 showing the rotor disk from below, i.e. as seen during operation from the container bottom 17. In practice, such rotor disks 1 are most often used in large-volume receptacles 2 in which a great amount of polymer material with the corresponding great weight is present. A correspondingly great pressure rests on the rotor disk 1. In these cases, the diameter of such a rotor disk 1 lies within the range of approximately 2 m and more.

The rotor disk 1 has a disk body 3 on whose top side 4 mixing and/or comminuting tools 5 may be arranged. On the opposite underside 6 of the disk body, a number of coveying ribs 7 extending from the interior to the exterior are arranged. All conveying ribs 7 are curved concavely in the rotational direction of the disk 1, with the curvatures running uniformly in the shape of a circular arc. The curvature radius of the conveying ribs 7 is less than the radius of the rotor disk 1 and amounts to about 65% thereof. Also, the curvatures of all conveying ribs are nearly identical relative to each other.

Two groups of conveying ribs 7 are provided, to with longer and shorter ones, which are arranged alternating to each other. The longer conveying ribs 7 start at an inner circular central area 14 whose radius is about 30% of the radius of the rotor disk 1. The shorter conveying ribs 7 start at an outer central area 15 whose radius is about 5% of the radius of the rotor disk 1. All conveying ribs run continuously all the way to the extreme edge of the rotor disk 1 or, respectively, of the disk body 3.

The conveying ribs 7 are not aligned radially relative to the center 8 of the rotor disk 1.

For example, the outer end sections of all conveying ribs 7 are aligned nearly tangentially to the outer edge of the rotor disk, to with at an outer intersecting angle α of about 14° as measured at the point where the conveying rib 7 reaches the edge or, respectively, the circumference between the tangent placed at the extreme edge and the tangent placed at the conveying rib 7 where the coveying rib (7) touches the extreme edge or, respectively, circumference.

The inner initial sections of the longer conveying ribs 7 are oriented relative to the inner central area 14 at a first inner intersecting angle $\beta_1$ of about 15°, in each case measured at the end point of the conveying rib 7 between the tangent on the inner central area 14 and the tangent on the conveying rib 7 where it or, respectively, the conveying rib 7 touches the inner central area 14.

The inner initial sections of the shorter conveying ribs 7 are oriented relative to the outer central area 15 at a second inner intersecting angle $\beta_2$ of about 35° to 40°, in each case measured at the end point of the conveying rib 7 between the tangent on the outer central area 15 and the tangent on the conveying rib 7 where it or, respectively, the conveying rib 7 touches the outer central area 15.

In this case, it will be advantageous if $\beta_2$ is greater than $\mu_1$.

In the contact area at the inner central area 14 and the outer central area 15, the coveying ribs 7 converge at an acute angle or, respectively, end there.

With conveying ribs 7 designed in that way, large as well as small polymer particles can be transported during operation toward the exterior or, respectively, a force directed towards the exterior is exerted from the center 8 of the rotor disk 7 upon the particles grasped by the conveying ribs 7. As a rule, the conveying effect is brought about by the mechanical effect of the conveying ribs 7 on the polymer particles since the treatment usually occurs in a vacuum. But treatment under ambient pressure is also possible in the same manner, with flow effects occurring in addition to the mechanical contacts between conveying ribs 7 and polymer particles.

In FIGS. 2, 3 and 4, the rotor disk 1 is represented in a cross section through the center 8. On the top side 4 of the disk body 3 facing the container during operation, mixing and/or comminuting tools 5 may be arranged. In the embodiment at hand, such tools are not shown. The mixing and/or comminuting tools 5 may involve shovels, knives or the like. They grasp the polymer particles and bring them into a rotational movement which leads to a mixing vortex forming in the container. In addition, the particles are heated and kept in a constant mixing process, thereby preventing any adhesion or, respectively, fusing even at higher temperatures. If necessary, a shredding or, respectively, comminution of larger granulates will occur as well.

The conveying ribs 7 are arranged on the underside 6 of the disk body 3. In this case, the thickness of the disk body 3 is constant and uniform within an inner area 9. This inner area 9 extends to about two thirds of the radius of the rotor disk 1. Starting at a certain distance 18 from the center 8 of the rotor disk 1, the thickness of the disk body 3 decreases. In the example at hand, the radial distance 18 amounts to about 68% of the radius of the rotor disk 1. Also starting from this radial distance 18, the height of the coveying ribs increases correspondingly towards the exterior while the height of the conveying ribs 7 is constant and uniform within the inner area 9.

From FIGS. 2 through 4 it can be seen that the thickness of the disk body 3 decreases only to a minor degree, in the embodiment at hand by a mere 2 mm. In the same manner and to the same extent, the height of the conveying ribs 7 increases as well, following their course towards the exterior so that the overall thickness of the rotor disk 1 remains the same and uniform across its entire radius. In this outer area, only the distance between the disk body 3 or, respectively, the underside 6 and the uppermost points or, respectively, ridges of the conveying ribs 7 becomes larger or, respectively, the area between the conveying ribs 7 becomes somewhat higher.

The points or, respectively, areas of the conveying ribs 7 farthest from the top side 4 form a level plane 10, with this plane 10 being aligned parallel to the likewise level top side 4 of the disk body 3.

In the example at hand, the decrease in the thickness of the disk body 3 runs continuously or, respectively, via a slanted plane. The underside 6 of the disk body 3 is slanted in the outer area in which its thickness decreases and sloped upward towards the top side 4 at an angle γ of about 0.5°. The rotor disk 1 or, respectively, the disk body 3 therefore has, in a manner of speaking, the shape of a truncated cone with a flattened exterior circumferential ridge.

In accordance with an additional possible embodiment, the thickness of the disk body 3 may also decrease continually or, respectively, via steps which entails advantages in the case of certain recycling materials.

Moreover, it is provided that at least one hollow space 13 flowed through by a coolant is formed in the interior of the disk body 3 through which a cooling effect can occur on the disk.

In FIG. 5, a cross section through a conveying rib 7 is shown. Each conveying rib 7 has an essentially triangular cross section, with a conveying surface 11 aligned level in the direction of rotation and essentially aligned vertically relative to the underside 6 and a plane shoulder surface 12 sloping downward at an angle δ between 10° and 35°, in particular about 15°, downstream relative to the direction of rotation.

FIG. 6 shows a view of a conveying rib 7 as seen at an angle from the side of the rotor disk 1. It can be seen that the shoulder surface 12 does not transition into the underside 6 continuously, directly or, respectively, at an acute angle but rather via a ridge or, respectively, a step 20. However, the transition may also occur without a step 20.

FIG. 7 shows a rotor disk 1 in accordance with the invention during operation, to with used in a device for the treatment and conditioning of synthetic material. The lower left area of such a device is shown in FIG. 7. In this case, the rotor disk 1 is placed in an evacuatable receptacle 2 which has a level plane, a horizontal bottom surface 17 and vertical lateral walls 18. The rotor disk 1 is arranged in immediate proximity of the bottom and parallel to the bottom surface 17 and is supported by a shaft 19 essentially aligned vertically, and it can also be driven via this shaft 19. Due to the rotation of the rotor disk 1, in particular by means of the mixing tools 5, the material present in the receptacle 2 is moved and experiences, among other things, a circulatory movement around the axle of the shaft 19.

The distance 21 between the rotor disk 1, to with between the outermost points or, respectively, edges or, respectively, ridges of the conveying ribs 7 or, respectively the plane 10 farthest from the disk and the bottom surface is relatively small and lies in the range between about 5 to 6 mm. The distance 21 between the bottom surface 17 and the rotor disk 1 is depicted in FIG. 6 schematically and not to scale. The disk having a diameter of about 2,000 mm usually rotates at a rotational speed of 10 to 300 revolutions per minute, e.g. at 20 to 150 rpm.

A particularly advantageous embodiment of a device is equipped with an evacuatable receptacle 2 with a circular cross section and a vertical axis into which the synthetic material, in particular of the thermoplastic kind, e.g. PRT (polyethylene terephthalate), to be processed is fed from above through a feed opening in the form of grist consisting of bottles, bottle pre-moldings, foils, flakes, etc. If the material to be processed is to be processed in a vacuum, a lock is attached to this opening whose lock chamber can be sealed by means of two sliders that can be moved back and forth by double-action cylinders. At the top, a feed funnel is attached to the lock into which the material to be processed is entered in batches or continuously by means of a feed mechanism (not shown), e.g. a conveyor belt. An evacuation line leading to an evacuation device is attached to the lock chamber. An additional evacuation line leads from the receptacle 2 to the evacuation device.

The receptacle 2 has vertical lateral walls 18 and a horizontal bottom 17. Near the bottom 17, a tool carrier is arranged which is formed by a horizontal circular rotor disk 1 resting on a shaft 19 which penetrates the bottom 17 in vacuum-tight fashion and which is driven by a motor for a rotation in the direction of the arrow. At its surface 4, the disk bears several tools 5 distributed at equal distances around the circumference of the rotor disk 1 which act on the synthetic material present in the container 2 during the rotation of the disk 1. On the one hand, this drives the synthetic material into a circulation around the axis 19, on the other hand, the centrifugal force tries to move the synthetic material in a radial direction towards the lateral wall 18. A mixing vortex is created to the effect that a portion of the synthetic material will rise up along the lateral wall 18, reaching a culmination point during this circulation and finally falling back into the area of the container axis. But not the entire amount of the synthetic material participates in this uprising because a portion of the synthetic material hurled off by the disk 1 will try to penetrate into the space below the disk 1, in particular if a lot of material is present in the container.

In order to lessen this effect to some degree, the disk 1 in the case at hand bears several shovels set at an angle and arranged in equal intervals around the circumference of the disk. These shovels impart a preferred upward movement on the synthetic material hurled off from the disk 1 by the tools 5, thereby preventing, in a way, synthetic portions from ending up in the space below the disk 1 of the tool carrier during the processing of the material in the container 2.

However, this effect is not optimized until the conveying ribs 7 in accordance with the invention are arranged on the underside 4 of the disk 1 which are arranged in such a way that the synthetic material ending up or, respectively, pressing into the critical area is transported in the direction of the lateral wall 18. The synthetic material moved towards the exterior in this fashion will then be grasped by the shovels and be transported upward again.

The invention claimed is:

1. A rotor disk configured to be installed in a receiving container for the treatment of polymers, comprising:
a disk body shaped substantially as a disk and rotatable about an axis thereof, the disk body comprising an upper face and a lower face, wherein the upper face is configured for either or both of a mixing tool and a comminuting tool to be provided on the upper face; and
a plurality of conveying ribs disposed on the lower face of the disk body, wherein the ribs extend from a central region of the disk body toward an outer edge of the disk body, wherein said conveying ribs are configured to convey polymer particles toward the edge of the disk body during rotation of the disk body about the axis, wherein the conveying ribs are curved concavely in a direction of rotation of the rotor disk, wherein a particular conveying rib of the plurality of conveying ribs has a first point at the central region of the particular conveying rib, wherein the particular conveying rib has a second point farther from the axis than the first point, wherein the particular conveying rib at the first point protrudes from the disk body by a first distance, wherein the particular conveying rib at the second point protrudes from the disk body by a second distance, wherein the second distance is greater than the first distance, and wherein the second point is intersected by a line tangent to the particular conveying rib at the second point, wherein the line is oriented at an angle $\alpha$ between 0° and 25° with respect to the edge of the disk body,
wherein the disk body extends from a plurality of centermost portions of centermost conveying ribs toward the axis.

2. The rotor disk of claim 1, wherein the curvatures of all of the conveying ribs are substantially identical.

3. The rotor disk of claim 2, wherein each of the curvatures is in the shape of a circular arc.

4. The rotor disk of claim 1, wherein the conveying ribs comprise at least two groups of conveying ribs, wherein a first one of the groups of conveying ribs begins from an inner central region and wherein a second one of the groups of conveying ribs begins from an outer central region.

5. The rotor disk of claim 4, wherein the inner central region is circular and the outer central region is circular, wherein inner sections of the first group of conveying ribs extend to the inner central region at a first intersecting angle $\beta_1$ between 0° and 45° and inner sections of the second group of conveying ribs extend to the outer central region at a second intersecting angle $\beta_2$ between 0° and 45°, wherein the second inner intersecting angle $\beta_2$ is larger than the first intersecting angle $\beta_1$, wherein the intersecting angles are measured between respective tangents of the conveying ribs and tangents of the inner central area at intersections of the respective tangents.

6. The rotor disk of claim 1, wherein each conveying rib comprises a conveying surface that is substantially perpendicular to the lower face, and a beveled plane flank surface that is inclined with respect to the lower face.

7. The rotor disk of claim 1, wherein a thickness of the disk body is greater at the central region than at the edge.

8. The rotor disk of claim 1, wherein a height of each conveying rib is greater at the edge than at the central region.

9. The rotor disk of claim 1, wherein a thickness of the disk body is greater at the central region than at the edge, and wherein a height of each conveying rib is greater at the edge than at the central region.

10. The rotor disk of claim 1, wherein a thickness of the rotor disk is substantially uniform and constant.

11. The rotor disk of claim 7, wherein the thickness of the disk body is constant within an inner area.

12. The rotor disk of claim 1, wherein the upper face of the disk body is a level plane.

13. The rotor disk of claim 7, wherein the lower face of the disk body comprises a slanted area.

14. The rotor disk of claim 7, wherein a decrease of the thickness of the disk body is continuous.

15. The rotor disk of claim 7, wherein a decrease of the thickness of the disk body is discontinuous.

16. The rotor disk of claim 1, further comprising a hollow space in the disk body, wherein the hollow space is configured for a coolant to fill the hollow space or flow therethrough.

17. A device for the treatment and conditioning of synthetic material, comprising:
a receiving container comprising a plane level bottom surface and lateral walls; and
a rotor disk rotatably installed in the receiving container near and parallel to the bottom surface, the rotor disk comprising:
a disk body shaped substantially as a disk and rotatable about an axis thereof, the disk body comprising an upper face and a lower face;
either or both of a mixing tool and a comminuting tool provided on the upper face; and
a plurality of conveying ribs disposed on the lower face of the disk body, wherein the ribs extend from a central region of the disk body toward an outer edge of the disk body, wherein said conveying ribs are configured to convey polymer particles toward the edge of the disk body during rotation of the disk body about the axis, wherein the conveying ribs are curved concavely in a direction of rotation of the rotor disk, wherein outer end sections of the conveying ribs are oriented at an angle $\alpha$ between 0° and 25° with respect to the edge of the disk body, wherein a particular conveying rib of the plurality of conveying ribs has a first point at the central region of the particular conveying rib, wherein the particular conveying rib has a second point farther from the axis than the first point, wherein the particular conveying rib at the first point protrudes from the disk body by a first distance, wherein the particular conveying rib at the second point protrudes from the disk body by a second distance, wherein the second distance is greater than the first distance, and wherein the second point is intersected by a line tangent to the particular conveying rib at the second point, wherein the line is oriented at an angle $\alpha$ between 0° and 25° with respect to the edge of the disk body,
wherein the disk body extends from a plurality of centermost portions of centermost conveying ribs toward the axis.

18. The device of claim 17, wherein the ribs have lowermost edges, wherein a distance between the lowermost edges of the conveying ribs and the bottom surface is less than the thickness of the disk body.

19. The rotor disk of claim 9, wherein a difference in the thickness of the disk body between the central region and the edge is equal to a difference in the height of the conveying ribs between the central region and the edge.

20. The rotor disk of claim 8, wherein the height of the ribs is constant within an inner area.

* * * * *